(12) United States Patent
Hagen et al.

(10) Patent No.: US 11,966,253 B2
(45) Date of Patent: Apr. 23, 2024

(54) DISPLAY DEVICE FOR A VEHICLE

(71) Applicant: BEHR-HELLA THERMOCONTROL GMBH, Lippstadt (DE)

(72) Inventors: Andreas Hagen, Lippstadt (DE); Winfried Fust, Lippstadt (DE)

(73) Assignee: BEHR-HELLA THERMOCONTROL GMBH, Lippstadt (DE)

( * ) Notice: Subject to any disclaimer, the term of this patent is extended or adjusted under 35 U.S.C. 154(b) by 256 days.

(21) Appl. No.: 17/613,313

(22) PCT Filed: May 27, 2020

(86) PCT No.: PCT/EP2020/064729
§ 371 (c)(1),
(2) Date: Nov. 22, 2021

(87) PCT Pub. No.: WO2020/239851
PCT Pub. Date: Dec. 3, 2020

(65) Prior Publication Data
US 2022/0229465 A1    Jul. 21, 2022

(30) Foreign Application Priority Data
May 28, 2019 (DE) .................... 10 2019 114 357.8

(51) Int. Cl.
*G06F 1/16* (2006.01)
*B60K 35/00* (2006.01)
(Continued)

(52) U.S. Cl.
CPC ............ *G06F 1/1601* (2013.01); *B60K 35/00* (2013.01); *B60K 35/50* (2024.01); *B60K 35/22* (2024.01);
(Continued)

(58) Field of Classification Search
CPC ........ B60K 2370/816; B60K 2360/816; G02F 1/133317; G06F 1/1601; G06F 1/1613; G06F 1/1626; G06F 1/1637
See application file for complete search history.

(56) References Cited

U.S. PATENT DOCUMENTS 7,420,798 B2    9/2008  Takahashi
11,126,024 B2*  9/2021  An ................... G02F 1/133308
(Continued)

FOREIGN PATENT DOCUMENTS

DE          197 22 682 A1   12/1998
DE    10 2009 048 682 A1    4/2011
(Continued)

OTHER PUBLICATIONS

International Search Report (PCT/ISA/210) issued in PCT Application No. PCT/EP2020/064729 dated Sep. 21, 2020 with English Translation.
(Continued)

*Primary Examiner* — Anthony Q Edwards
(74) *Attorney, Agent, or Firm* — BakerHostetler

(57) ABSTRACT

The display device (12) for a vehicle is provided with a display (18) having a display surface (20) on a front side and having a rear side facing away from the latter and a cover screen (14) arranged in front of the display surface (20). Furthermore, the display device (12) has a decorative frame (16) which is connected to the edge of the cover screen (14) and protrudes on all sides over the edge of the display (18), and a rear-side housing shell (17) which has a rear wall (36) with an edge web (38) rising from the latter. The rear wall (36) of the housing shell (17) is arranged at a distance from the rear side of the display (18), wherein the edge web (38) of the housing shell (17) is connected to the decorative frame (16) by means of an adhesive.

6 Claims, 2 Drawing Sheets

Figure 1:
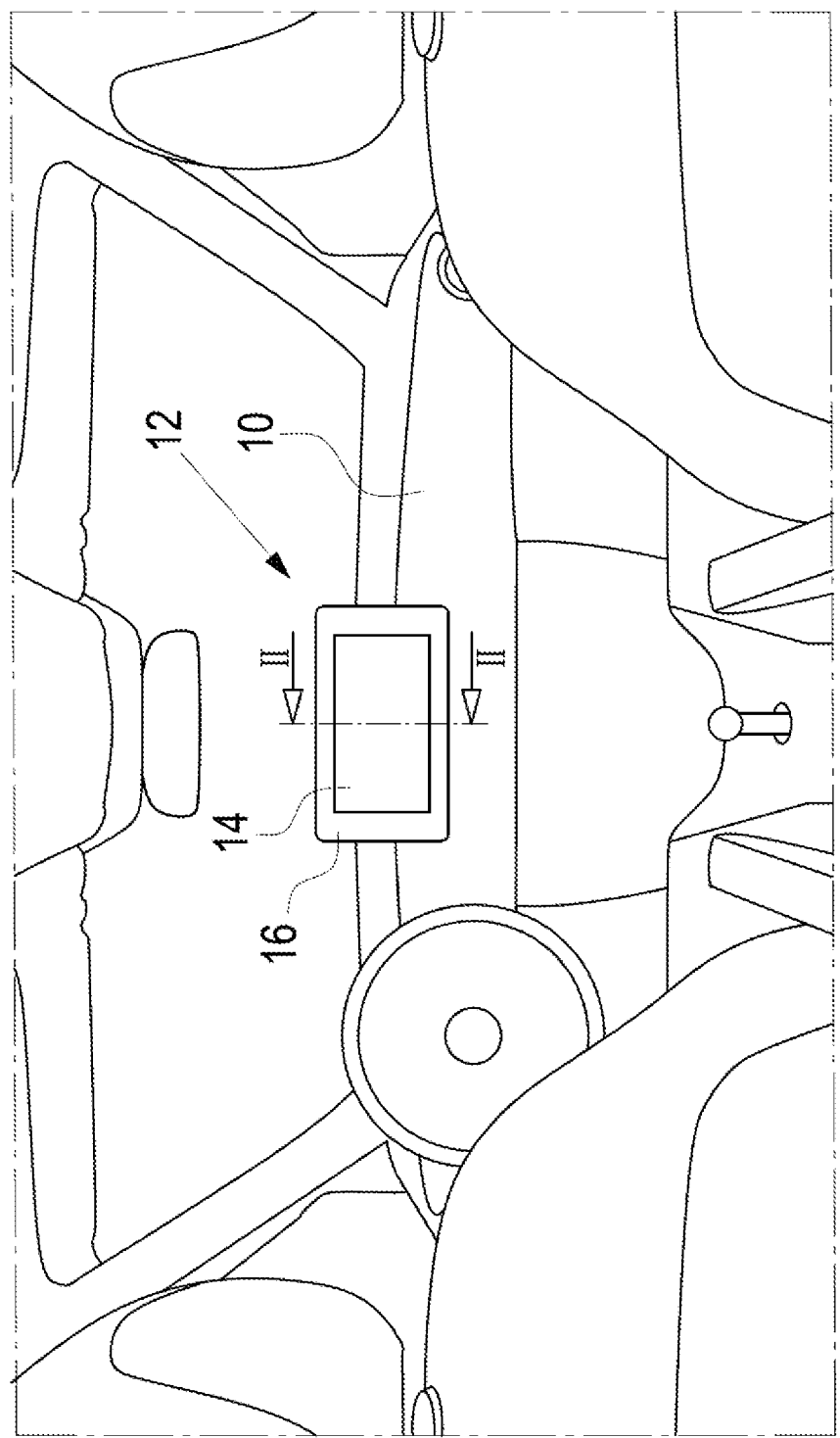

(51) Int. Cl.
  *B60K 35/50* (2024.01)
  *B60K 35/22* (2024.01)
(52) U.S. Cl.
  CPC .. *B60K 2360/691* (2024.01); *B60K 2360/816* (2024.01)

(56) References Cited

U.S. PATENT DOCUMENTS

| | | | |
|---|---|---|---|
| 11,768,549 B2* | 9/2023 | Boggs | G02F 1/13338 428/1.32 |
| 2016/0110004 A1 | 4/2016 | Huston et al. | |
| 2018/0113352 A1* | 4/2018 | Arita | G02B 6/0055 |
| 2018/0120633 A1* | 5/2018 | Yang | G02B 6/0088 |
| 2021/0354560 A1* | 11/2021 | Matsuoka | G06F 1/1601 |

FOREIGN PATENT DOCUMENTS

| | | |
|---|---|---|
| DE | 10 2015 007 502 A1 | 2/2016 |
| DE | 10 2014 019 324 A1 | 6/2016 |

OTHER PUBLICATIONS

Written Opinion (PCT/ISA/237) issued in PCT Application No. PCT/EP2020/064729 dated Sep. 21, 2020.

\* cited by examiner

DISPLAY DEVICE FOR A VEHICLE

CROSS-REFERENCE OF RELATED APPLICATIONS

This application is the U.S. National Phase under 35 U.S.C. § 371 of International Patent Application No. PCT/EP2020/064729, filed on May 27, 2020, which claims the benefit of German Patent Application No. 10 2019 114 357.8, filed on May 28, 2019, the entire disclosures of each are incorporated by reference herein.

The present patent application claims the priority of the national German Patent Application 10 2019 114 357.8 of May 28, 2019, the disclosure of which is incorporated into the present application by reference.

The invention relates to a display device for a vehicle which, in addition to the display of information, may, it so desired, serve for the manual input of commands, for which purpose the display device may be designed as a touch screen, for example.

Display devices comprising displays are increasingly mounted in vehicles. For example, they may be used as so-called CID (Central Input Devices) and are then also provided with a command input function. In these cases, these are mostly touch screens which may have a variety of graphical surfaces.

Recently, self-supporting display devices arranged at and/or on the instrument panels have found their way into the automotive domain. These display devices comprise a stable rear wall serving to hold the display of the display device. The self-supporting display devices are arranged on the instrument panel either rigidly or movably so that they can be automatically moved to a rest or retracted position when not in use.

For reasons of stability, the rear walls or rear housing shells of the above-mentioned display devices comprise metal or cast metal.

In prior art, the displays are fixed to the housing shell or rear walls by means of adhesive tapes, with the rear side of the display resting flat against the housing shell or the rear wall thereof. Here, it is necessary that the rear wall is planar. The TFT displays mainly used today are rather sensitive to mechanical stresses and show optical abnormalities when fixedly adhered on uneven surfaces.

DE-A-197 22 682 describes a display device for buses that is arranged behind a side, front or rear window of a bus. The display device comprises a display held by a fastening means. The fastening means is open at the front side which faces the relevant window of the bus in the installed state of the display device, so that the display surface of the display is visible from outside through the relevant bus window. The fastening means may be removably fastened on the relevant window, with the display surface of the display being spaced from bus window.

DE-A-10 2014 019 324 describes a display device comprising a display for installation in a vehicle, the display device including a decorative frame surrounding the display.

It is an object of the present invention to provide a display device, the display of which is mounted with sufficient stability and strength on a rear housing shell, without requiring a two-dimensional bonding of the display and the housing shell.

To achieve this object, the invention proposes a display device for a vehicle, which is provided with:

a display with a display surface on a front side and with a rear side opposite thereto, a cover screen arranged in front of the display surface, a decorative frame which is connected to the edge of the cover screen and protrudes on all sides over the edge of the display, and a rear housing shell which has a rear wall with an edge web protruding from the latter, the rear wall of the housing shell being arranged at a distance from the rear side of the display and the edge web of the housing shell is connected to the decorative frame by means of an adhesive.

According to the concept of the invention, the connection of the rear housing shell and the rear wall of the display device is made by bonding the edge of the housing shell to the decorative frame of the display device. The decorative frame of the display device itself is a part of the cover screen which is also referred to as "cover glass". To this end, the rear wall of the display device is designed as a housing shell with a protruding edge web that is designed to be circumferential. Thus, the edge web protrudes from the rear wall (i.e. the bottom wall of the housing shell) and surrounds the display on all sides. The free end of the edge web is connected to the decorative frame by means of the adhesive, which frame surrounds the cover screen on all sides. In the connected state of the housing shell and the decorative frame, the rear of the display is spaced from the rear wall of the housing shell; thus, an air gap exists between both. Accordingly, the display is no longer in contact with the rear and is in particular no longer two-dimensionally bonded to the rear. As is common, the display is fastened or mounted to the cover screen by means of a transparent adhesive (optical bonding) and thus "hangs" from the same. In view of the vibrations occurring in a vehicle while driving, this connection of the display and the cover screen is stable. Mechanical stresses between the display and the cover screen cannot occur, since both the display surface of the display and the cover screen are basically planar. If it is intended to use curved cover screens, the difference between the curved cover screen and the planar display surface of the display is compensated for by the transparent adhesive and, meanwhile, there are displays with curved display surfaces, with the cover screens being designed to match the shape thereof, whereby both can again be bonded with a constant distance therebetween. In all these variants, a touch panel may also be provided as a touch sensor system that operates optically, capacitively, inductively or resistively.

As already mentioned above, the invention is particularly suitable for display devices that are arranged self-supported. To this end, the housing shell has a mounting part, which is typically formed to be integral, for mounting the housing shell in a vehicle for a self-supporting arrangement of the display device at and/or on and/or in the vehicle instrument panel. As an alternative, it is also possible that the housing shell is coupled with an extension and retraction mechanism by which the display device can automatically extended and retracted.

In a further suitable embodiment of the invention it is provided that the adhesive connecting the edge web of the housing shell to the decorative frame on the cover screen of the display is designed as a strip-shaped adhesive material bed on the decorative frame, into which the edge web of the housing shell is immersed at its end averted from the rear wall of the housing shell. The strip-shaped adhesive material bed is sometimes also referred to as an "adhesive bead".

With regard to the possibility of tolerance compensation, it is advantageous if the edge web of the housing shell is immersed into the adhesive material bed at its end averted from the rear wall of the housing shell while maintaining a distance from the decorative frame—as viewed in extension of the edge web.

In a further suitable embodiment of the invention it is provided that the decorative frame comprises a connecting section extending circumferentially around the cover screen and having an adhesive application surface for the adhesive connecting the edge web of the housing shell to the decorative frame on the cover screen of the display. As already mentioned above, the decorative frame is itself fastened to the cover screen and is formed along the circumference thereof. The decorative frame is provided with an adhesive application surface which is located in a connecting section of the decorative frame which serves to connect to the edge web of the housing shell, possibly with the interposition of the strip- or strand-shaped adhesive material bed. The edge web may rest on the decorative frame or may also be arranged at a distance from the connecting section of the edge web by being partially immersed into the adhesive material bed.

Typically, the display is connected to the cover screen by means of a transparent adhesive layer and/or the display comprises a touch panel or a touch sensor system that operates optically, capacitively, inductively or resistively. Usually, the touch panel is connected to the cover screen and/or the display surface of a display by means of an optically transparent adhesive, but may also be an integral part of the display.

Typically, displays are provided with a backlighting unit with which the display surface of the display can be backlit. Such a backlighting unit is located rearward of the display surface of the display. Usually, a diffusor for homogenizing the backlighting of the display surface is located between the backlighting unit and the electronic components. The backlighting unit forms the rear of the display.

Figure 2:
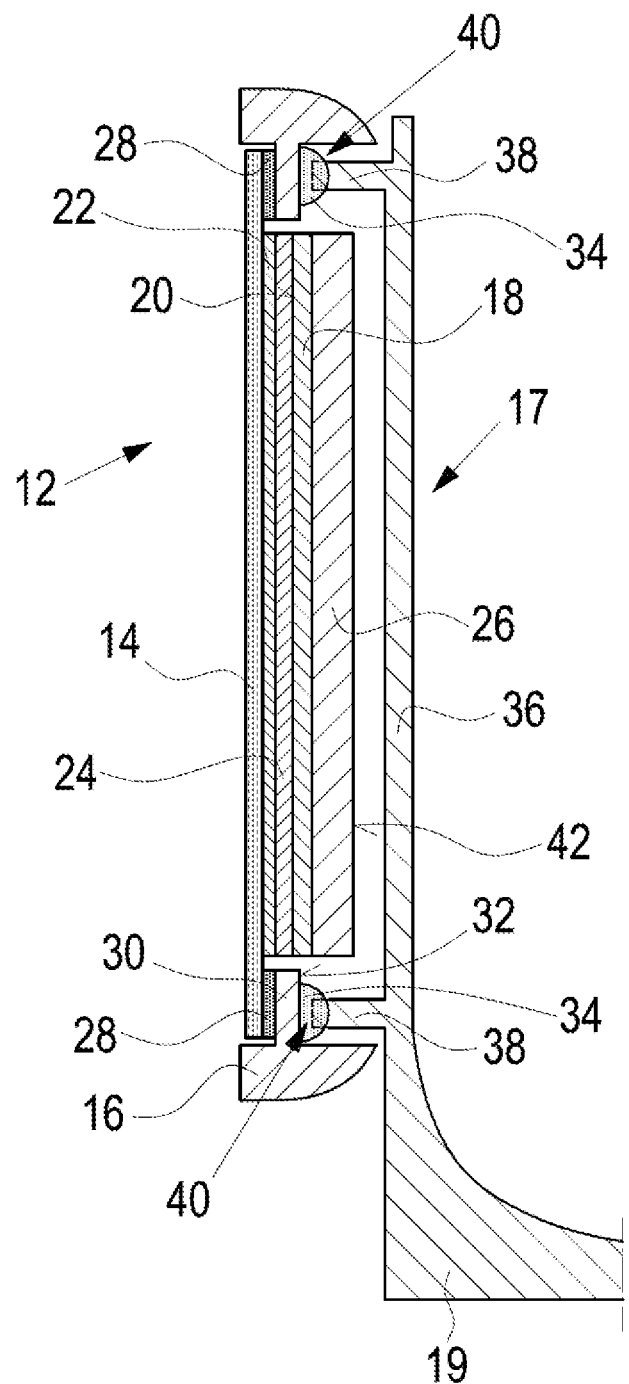

The invention will be explained hereinafter with reference to an embodiment and to the drawings. In detail, the Figures show:

FIG. 1 a view of the instrument panel of a vehicle with a display device arranged standing upright on the instrument panel, and FIG. 2 a section through the display device along II-II in FIG. 1 to clarify the structure of the display device.

FIG. 1 illustrates a view of the instrument panel 10 in the interior of a vehicle. A self-supporting display device 12, which in the present embodiment is designed as a touch screen, is situated on the instrument panel 10. At the front, the display device 12 has a cover screen 14 with a circumferential frame 16. Rearward of the cover screen 14, a housing shell 17 is located which closes the display device 12 to the rear and comprises a mounting part 19 for self-supported mounting on the instrument panel 10 (see FIG. 2).

The actual display 18 with the display surface 20 is situated behind the cover screen 14. Between the cover screen 14 and the display 18, typically a touch panel 22 is located which is connected to the cover screen 14 by means of a transparent adhesive (not illustrated) and to which the display surface 20 of the display 18 is bonded by means of a transparent adhesive layer 24 (optical bonding). Usually, a backlighting unit 26 with a diffusor (not illustrated) is located behind the display 18.

The decorative frame 16 is connected to the cover screen 14 e.g. by adhesion, the adhesive being illustrated at 28. The decorative frame 16 may, however, also be integrally formed as a single piece with the cover screen 14. For example, the decorative screen 16 has an inward protruding connecting section 30 as a kind of inner flange on which the cover screen 14 rests bonded by means of the adhesive 28. On the lower side of the connecting section 30 averted from the adhesive, an adhesive application surface 32 is provided on which a strand- or strip-shaped adhesive material bed 34 is applied.

The housing shell 17 has a rear wall 36 and a circumferential edge web 38 protruding therefrom, the free end 40 thereof being immersed into the adhesive material bed 34, namely, in this embodiment, with a distance to the adhesive application surface 32 of the connecting section 30 of the decorative frame 16.

In the bonded state of the housing shell 17 and the decorative frame 16, the rear 40 of the display 18 is spaced from the rear wall 36 of the housing shell 17.

For mounting the display device 12, the housing shell 17 is set, for example, on the display 18 pre-assembled to the cover screen 14 with the decorative frame 16. At this point, the display 18 is connected to the cover screen 14. The decorative frame 16 of the cover screen or of the display device 12 is also already provided on the cover screen 14. Using a positioning device, the housing shell 17 is then slipped over the display 18 from behind in such a manner that the free end 40 of the edge web 38 is pressed into the not yet cured adhesive material bed 34. Here, care is taken to keep the rear wall 36 of the housing shell 17 spaced from the rear 42 of the display 18. Due to the fact that the edge web 38 and the connecting section 30 of the decorative frame 16 are not in contact, possible manufacturing tolerances of the two partial components connected according to the above described method can be compensated for. Moreover, it is possible to adjust the design gap between the decorative frame 16 and the housing shell 17 accordingly.

LIST OF REFERENCE NUMERALS 10 instrument panel
12 display device
14 cover screen
16 decorative frame
17 housing shell
18 display
19 mounting part
20 display surface
22 touch panel
24 transparent adhesive layer
26 backlighting unit
28 adhesive
30 connecting section of the decorative frame
32 adhesive application surface
34 adhesive material bed
36 rear wall of the housing shell
38 edge web
40 end of the edge web
42 rear of the display

The invention claimed is:

1. A display device for a vehicle, comprising:
a display with a display surface on a front side and with a rear side opposite thereto,
a cover screen arranged in front of the display surface,
a decorative frame which is connected to an edge of the cover screen and protrudes on all sides over an edge of the display, and
a rear housing shell which has a rear wall with an edge web protruding from the latter,
the rear wall of the housing shell being arranged at a distance from the rear side of the display and the edge web of the housing shell is connected to the decorative frame by means of an adhesive, wherein the decorative frame comprises a connecting section extending circumferentially around the cover screen and having an adhesive application surface for the adhesive connecting the edge web of the housing shell to the decorative frame on the cover screen of the display.

2. The display device according to claim 1, wherein the housing shell comprises a mounting part for mounting the housing shell in a vehicle for a self-supporting arrangement of the display device at and/or on and/or in the vehicle instrument panel.

3. The display device according to claim 1, wherein the adhesive connecting the edge web of the housing shell to the decorative frame on the cover screen of the display is designed as a strip-shaped adhesive material bed on the decorative frame, into which the edge web of the housing shell is immersed at its end averted from the rear wall of the housing shell.

4. The display device according to claim 3, wherein the edge web of the housing shell is immersed into the adhesive material bed at its end averted from the rear wall of the housing shell while maintaining a distance from the decorative frame as viewed in extension of the edge web.

5. The display device according to claim 1, wherein the display is connected at its display surface to the cover screen by means of a transparent adhesive layer.

6. The display device according to claim 1, wherein the display or the cover screen comprises a touch panel.

* * * * *